Dec. 2, 1958 M. C. ANDREWS 2,863,133

NON-DESTRUCTIVE SENSING OF MAGNETIC CORES

Filed Nov. 23, 1954

INVENTOR.
MAXWELL C. ANDREWS

BY

William V. Schelberg

AGENT

United States Patent Office 2,863,133

Patented Dec. 2, 1958

2,863,133

NON-DESTRUCTIVE SENSING OF MAGNETIC CORES

Maxwell C. Andrews, Poughkeepsie, N. Y., assignor to International Business Machines Corporation, New York, N. Y., a corporation of New York Application November 23, 1954, Serial No. 470,564

5 Claims. (Cl. 340—174)

This invention relates to the employment of magnetic materials for the storage of binary digits and is directed in particular to arrangements for determining in a non-destructive manner which binary representation is stored in such an element.

It is known in the art that magnetic materials undergo changes in physical dimensions accompanying changes in magnetization while conversely, mechanical stresses applied to magnetic materials result in changes in their magnetic characteristics. It is with these basic phenomena that the present invention operates in conjunction with the use of magnetic bodies for memory applications.

In storing binary digits in pulse handling devices such as computing machines, the hysteresis characteristic of a magnetic material may be employed as a means for effecting storage of a binary representing pulse signal through the establishment of one or the other magnetic remanence state in the material. Thereafter, to determine which remanence state or binary representation is stored, the magnetic body must be activated to cause a change to an initial or reference remanence state. Should a reversal in magnetization take place, it then follows that the opposite remanence state had existed, and if no change in state occurs it is determined that the body had already been in the initial remanence state; these conclusions being measured by alternative pulse amplitudes developed in output windings linking the magnetic body.

The conventionally employed interrogation process described returns the magnetic body to an initial remanence state and destroys the stored information. Should apparatus be used wherein reference to the same data is required repeatedly, it must be restored to the magnetic elements each time it is read out at the expense of complex circuitry.

In accordance with the invention, a magnetic body retaining one or the other remanence magnetic state of storage may be sensed without destruction of the stored state, while clearing of the information is selectively controlled. This is accomplished by the application of mechanical stress to a magnetic memory element and through the flux change developed, determining the direction of magnetization maintained without inducing a permanent change.

One object of the present invention, therefore, is to provide a system for the non-destructive sensing of magnetic memory elements.

Another object of the invention is to provide means for determining the state of remanence magnetization of a magnetic body in response to applied stress.

The device which develops mechanical stress in the storage magnetic body may also be made operative in response to electrical signals and the piezoelectric property of certain materials such as barium titanate as well as the magnetostriction effects of a further magnetic body are employed for this purpose.

Accordingly, a further object of the invention is to provide a system for determining in a non-destructive manner the remanence state at which a magnetic memory element exists through magnetostrictive action of a further magnetic body or piezoelectric action of a voltage operated element.

Other objects of the invention will be pointed out in the following description and claims and illustrated in the accompanying drawings, which disclose, by way of example, the principle of the invention and the best mode, which has been contemplated, of applying that principle.

Figure 1:
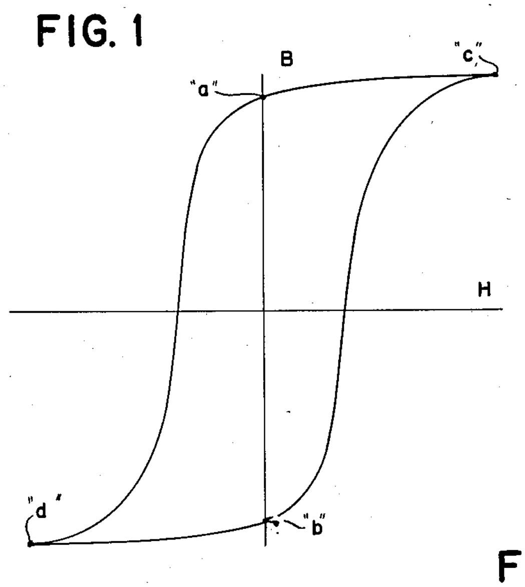
Figure 1 is a diagrammatic representation of the hysteresis curve for a ferromagnetic body.

Materials having a somewhat rectangular hysteresis loop and low coercive force are desired in magnetic bodies employed in memory systems. The hysteresis characteristic for a ferrite material of this type is illustrated in Figure 1 where the vertical axis represents the magnetic displacement or flux and the horizontal axis the applied magnetomotive force. When magnetized in either one or the other direction by a magnetomotive force applied by energizing windings on a body of the material, a state of saturation is attained with a force of sufficient magnitude. Upon relaxation of the applied force the body retains a distinct remanence state of magnetization. Remanence points "*a*" and "*b*," therefore, may be arbitrarily selected for representing binary one and zero signals. With state "*b*" taken as an initial or zero state, the application of a positive M. M. F. causes traversal to saturation state "*c*," then on relaxation of the M. M. F. returns to point "*a*."

Interrogation may conventionally comprise the application of an M. M. F. in a negative sense and the sensing of voltages developed in an output winding embracing the body. If the body is magnetized to point "*b*" and a negative M. M. F. applied, the loop is traversed to point "*d*" and on relaxation returns to point "*b*" with little flux change taking place and a low magnitude signal developed. On the other hand, if state "*a*" is stored, the traversal is from "*a*" to "*d*" and then to "*b*" with a large change in flux and corresponding large signal developed in the output winding. As a result of interrogation, however, the memory element is returned to point "*b*" and the stored information is destroyed.

In the proposed system the magnetic memory element comprises a ferrite material having low crystalline shape and stress anisotropy with a high magnetostriction constant $\lambda$, such as a nickel zinc or cobalt nickel zinc ferrite for example, however, the arrangement to be described is not considered limited to such compositions as all ferromagnetic materials are somewhat magnetostrictive. When in one of the remanence states "*a*" or "*b*," the flux vectors in individual domains of the ferrite material tend to align themselves as a group generally in one direction but may individually have flux components in other directions. The individual crystalline structures have an axis of preference for their flux vectors which axis is established by such forces as are presented by the ions or atoms of the material forming the crystalline lattice structure and other factors. In materials having low anisotropy, these forces are of low relative magnitude and consequently less external force is necessary to work against them in causing the flux vectors to be aligned in a displaced or rotated position either parallel or at right angles to the applied mechanical forces.

In accordance with the invention, mechanical stress is applied to a ferrite core that is magnetized in one or the other remanence state and the flux vectors are rotated a few degrees from the memory direction resulting in an increase or decrease in the component of residual flux which links the conventional output winding. This flux change induces a pulse in the winding having a polarity dependent upon the particular residual state and allows its determination. On removal of the mechanical force, the residual flux returns to its stable original direction because of the nature of the rectangular hysteresis loop material and the information is not destroyed.

Figure 2:
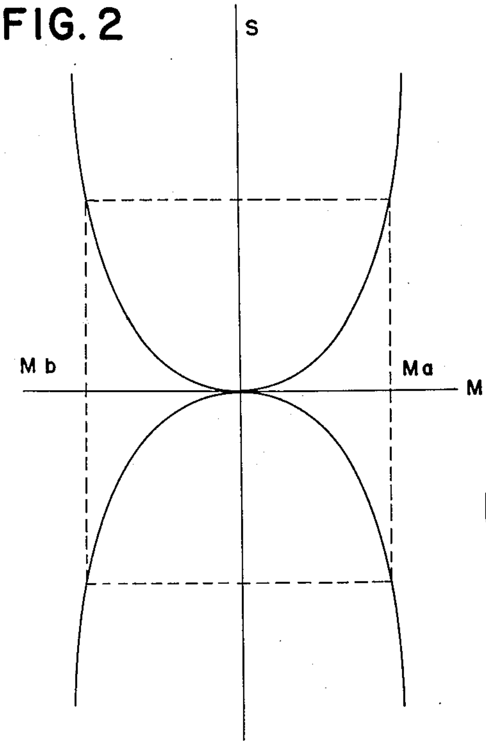
Figure 2 is a curve illustrating the magnetomechanical behavior of a ferromagnetic material.

The magnetostriction phenomenon described is illustrated graphically in Figure 2 where the vertical axis represents the degree of mechanical stress and the horizontal axis represents the state of magnetization. Residual state *"a"* is designated as M*a* and residual state *"b"* as M*b* with the curve above the axis representative of materials having a negative magnetostriction constant λ and that below the axis of materials having a positive magnetostriction constant. From the figure it will be observed that a change in residual state produces a corresponding change in stress and consequently in the physical dimensions of the body. Further, application of mechanical stress may cause either an increase or decrease in the component of magnetization from the residual state depending upon the magnetostriction constant and the type of stress applied.

The following cases are possible:

| Stress | Residual state | Flux change | |
|---|---|---|---|
| | | −λ | +λ |
| Circumferential compression | *a* | + | − |
| | *b* | − | + |
| Circumferential tension | *a* | − | + |
| | *b* | + | − |
| Axial compression | *a* | − | + |
| | *b* | + | − |
| Axial tension | *a* | + | − |
| | *b* | − | + |

On removal of the mechanical forces, the residual magnetic state is again attained, and the magnetic body stands at either point *"a"* or point *"b"* as the forces within the ferrite are re-established, and the information is not destroyed.

Figures 3A, 3B:
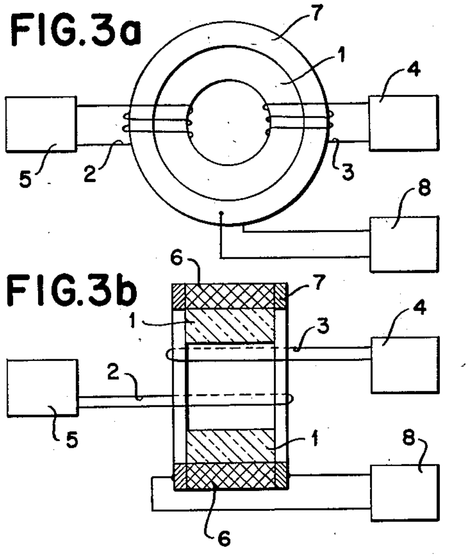
Figures 3 to 6 are diagrammatic showings of arrangements for applying mechanical stress to a magnetic body in the form of a toroid.

In a preferred embodiment of the invention as shown in Figure 3, the magnetic storage body comprises a ferrite core 1 such as that described having an input winding 2 and output winding 3 surrounding the magnetic circuit. A utilization circuit 4 is connected to the output winding and derives an electrical signal therefrom valiable in polarity in accordance with the stored remanence state as stress is applied. A signal pulse generator 5 is coupled to the input winding 2 and is adapted to apply a pulse of one polarity in representing a binary "1," and of opposite polarity in representing a binary "0." The construction of Figure 3 contemplates the application of mechanical stress in a circumferential direction with the force exerted by piezoelectric action of a ceramic material 6 such as $BaTiO_3$ which is bonded to the external periphery of the ferrite core. Piezoelectric materials undergo a change in dimensions in response to the application of electric fields and for this purpose conductive surfaces 7 are provided in intimate contact with the lateral edges of the ring of ceramic material 6 and are connected with a further pulse producing generator 8. The conductive surfaces 7 may be prepared by bonding a metallic element of corresponding size to the ceramic or by evaporation of conductive material thereto by conventional methods. The generator 8 may be adapted to apply a single pulse in which case a single output pulse is developed on winding 3, or a series of unidirectional pulses or alternating current pulses in which case the output on winding 3 comprise a series of alternating pulses, the phase of which are indicative of the state of remanent magnetism of the core 1.

Figure 4:
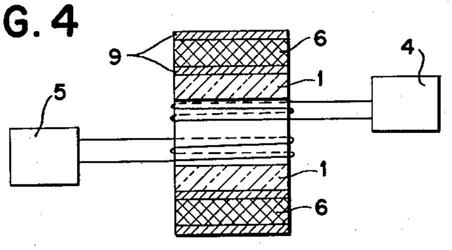
Figure 5:
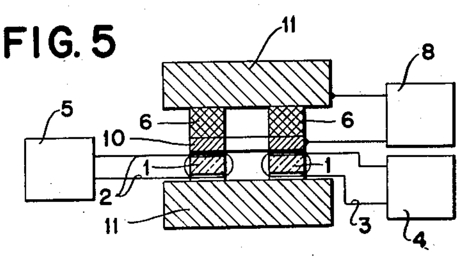

A modification of this arrangement is illustrated in Figure 4 where conductive surfaces 9 are provided circumferentially about the ferroelectric ceramic, and in Figure 5 where the stress is applied axially with conductive member 10 functioning as one terminal and one of the members 11 as the other terminal in applying an electric field to the ferroelectric 6, with both members 11 providing fixed supports between which the ferrite core and ceramic piezoelectric element are clamped.

The illustrated methods for providing stress are considered to be only several of numerous physical configurations which may be devised and it is to be understood that other forms and arrangements for accomplishing this purpose are to be considered within the realm of contemplation including means for applying torsion, transverse or longitudinal stress as well as tension and compression.

Figure 6:
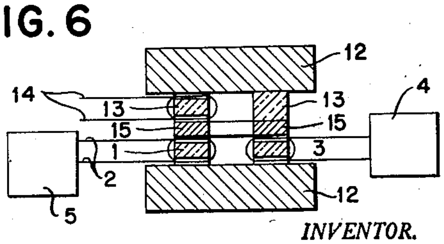

Further, materials other than ceramic piezoelectric compositions are adapted for developing readily controlled stress and the magnetostriction property of a further magnetic body is considered suitable for this purpose. Such an arrangement is illustrated in Figure 6, for example, where the memory core 1 is clamped between two fixed members 12 along with a reading core 13 and with the separate cores provided with windings distinct thereto and comprising a winding 14 on the core 13 which is pulsed for applying an interrogating stress axially to core 1. The magnetic circuits of cores 1 and 13 are isolated by means of a non-magnetic member 15 made of brass or some similar material. It is also considered that with the two cores and intermediate shield 15 may be rigidly fixed to one another so that lateral strain alone may be sufficient to interrogate the memory core provided the factor λ is sufficiently great, and the clamps 12 need not be employed.

Magnetostrictive material may also be employed in the illustrated arrangements of Figures 3, 4 and 5 rather than piezoelectric material by providing shielding strips of non-magnetic materials to separate the magnetic memory body from the magnetic stressing body.

The non-destructive magnetic core sensing systems described have the advantageous character mentioned above, that is, they are effective to determine the residual state at which a memory core stands without permanent loss of the information represented. The magnetostriction modification should be magnetically shielded for a high degree of accuracy in operation and additionally each of the system modifications should be operated at a uniform temperature.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a pulse responsive system, a magnetic body capable of assuming alternate states of magnetic remanence in representing binary information, a winding about said body adapted to be pulsed in one sense to store one binary representation and in the other sense to store the other binary representation, means comprising a piezoelectric element connected with said body and operable to apply stress thereto, and a further winding about said body in which signals are developed in response to operation of said latter means, said signals being indicative of the remanence state of said body.

2. Apparatus as set forth in claim 1 wherein said piezoelectric element is rigidly mechanically coupled with said body and has electrodes between which an electric field may be established to develop mechanical stress operable on said magnetic body.

3. In a pulse responsive system, a magnetic body capable of assuming alternate states of magnetic remanence in representing binary information, winding means inductively related with said body and adapted to be energized to cause said body to assume a representative remanence state, and means comprising a barium titanate element rigidly mechanically coupled with said body and having electrodes between which an electric field may be established to develop mechanical stress operable on said magnetic body, and further winding means inductively related with said body wherein signals are developed in response to operation of said barium titanate element, said signals being indicative of the remanence state of said body.

4. Apparatus as set forth in claim 3 wherein said magnetic body comprises a toroidal core of ferrite material.

5. In a pulse responsive system, a magnetic body capable of assuming alternate states of magnetic remanence in representing binary information, said body comprising a toroidal core of ferrite material, winding means inductively related with said body and adapted to be energized to cause said body to assume a representative remanence state, and means comprising a barium titanate element rigidly mechanically coupled with said body and comprising a ceramic material bonded to the external circumference of said core and having electrodes between which an electric field may be established to develop mechanical stress operable on said magnetic body, and further winding means inductively related with said body wherein signals are developed in response to operation of said barium titanate element, said signals being indicative of the remanence state of said body.

References Cited in the file of this patent

UNITED STATES PATENTS

| | | |
|---|---|---|
| 2,698,928 | Pulvari | Jan. 4, 1955 |
| 2,782,397 | Young | Feb. 19, 1957 |

OTHER REFERENCES

Publication I: British Journal of Applied Physics, vol. 2, October 1951, page 304.

Publication II: Automatic Digital Computation Proceedings of a Symposium, National Physics Lab., Mar. 25, 1953, pp. 199–210.

Publication III: Communications and Electronics, January 1954, pp. 822–830.